(12) United States Patent
Wu et al.

(10) Patent No.: US 8,164,724 B2
(45) Date of Patent: Apr. 24, 2012

(54) LIQUID CRYSTAL DISPLAY SUBSTRATE WITH PATTERNED AREA AT PERIPHERY REGION THEREOF

(75) Inventors: Tzung-Luen Wu, Miao-Li (TW);
Hung-Sheng Cho, Miao-Li (TW);
Chia-Ming Chan, Miao-Li (TW);
Kun-Hsing Hsiao, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 644 days.

(21) Appl. No.: 11/998,031

(22) Filed: Nov. 27, 2007

(65) Prior Publication Data
US 2008/0123035 A1 May 29, 2008

(30) Foreign Application Priority Data

Nov. 27, 2006 (TW) ............................... 95143792 A (51) Int. Cl.
*G02F 1/1337* (2006.01)
*G02F 1/1339* (2006.01)
(52) U.S. Cl. ........................ 349/123; 349/153
(58) Field of Classification Search .......... 349/123–129, 349/190, 153–154
See application file for complete search history.

(56) References Cited

U.S. PATENT DOCUMENTS

| 4,597,636 | A | 7/1986 | Hoshikawa | |
|---|---|---|---|---|
| 6,414,733 | B1 * | 7/2002 | Ishikawa et al. | 349/110 |
| 6,731,369 | B2 * | 5/2004 | Choo | 349/190 |
| 6,791,660 | B1 * | 9/2004 | Hayashi et al. | 349/190 |
| 6,862,072 | B2 | 3/2005 | Liu et al. | |
| 6,985,199 | B2 | 1/2006 | Takachi | |
| 7,209,200 | B2 * | 4/2007 | Lim et al. | 349/114 |
| 7,646,458 | B2 * | 1/2010 | Onda | 349/125 |
| 7,751,007 | B2 * | 7/2010 | Morimoto et al. | 349/123 |
| 2005/0073638 | A1 | 4/2005 | Byun et al. | |
| 2006/0017775 | A1 | 1/2006 | Li et al. | |
| 2007/0030436 | A1 * | 2/2007 | Sasabayashi | 349/153 |

FOREIGN PATENT DOCUMENTS

| CN | 1519628 A | 8/2004 |
|---|---|---|
| CN | 1834734 A | 9/2006 |
| TW | I264603 B | 10/2006 |

\* cited by examiner

*Primary Examiner* — Dung T. Nguyen
(74) *Attorney, Agent, or Firm* — WPAT., P.C.; Justin King (57) ABSTRACT

An exemplary liquid crystal display substrate (210) includes a display region (212), a periphery region (214) around the display region, a sealant adhering region (215), and an alignment film (260) formed on or over the display region and the periphery region. The sealant adhering region is between the display region and the periphery region. The alignment film at the periphery region includes a patterned area (213) adjacent to the sealant adhering region. The patterned area has a groove structure.

20 Claims, 6 Drawing Sheets

LIQUID CRYSTAL DISPLAY SUBSTRATE WITH PATTERNED AREA AT PERIPHERY REGION THEREOF

FIELD OF THE INVENTION

The present invention relates to liquid crystal display (LCD) substrates, and particularly to an LCD substrate with a patterned area at a periphery region thereof.

GENERAL BACKGROUND

An LCD panel is a main part of a typical LCD. When an LCD panel is manufactured, a common process is to manufacture a set of LCD panels joined together in a single LCD panel board. The LCD panel board is then cut up into a plurality of individual LCD panels. In detail, this process typically includes the following steps: forming electrodes on a pair of substrates; coating two alignment films on the substrates respectively, and rubbing the alignment films; distributing spacers on the substrates; coating a sealant on one of the substrates; adhering the two substrates together; cutting the substrates into a plurality of LCD panel preforms (or cells); injecting liquid crystal into each of the cells; and sealing each of the cells, thereby obtaining the plurality of LCD panels.

Figure 15:
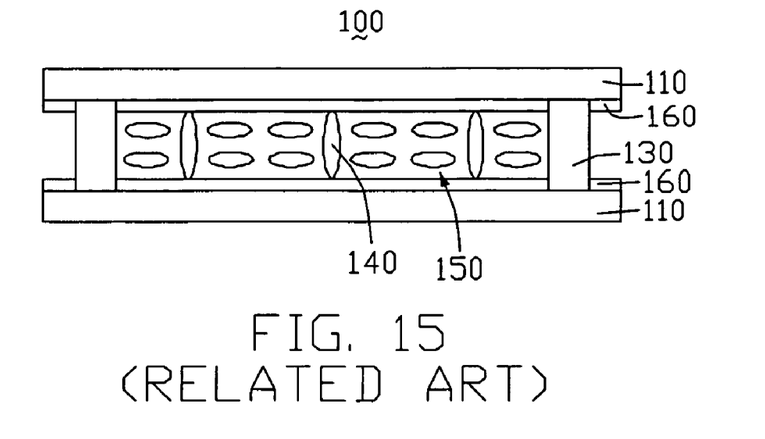
FIG. 15 is a side cross-sectional view of a conventional LCD panel, the LCD panel having two LCD substrates and two alignment films coated on the two LCD substrates, respectively.

FIG. 15 is a side view of a conventional LCD panel. The LCD panel 100 includes two LCD substrates 110, two alignment films 160 respectively coated on inner surfaces of the LCD substrates 110, a liquid crystal layer 150 interposed between the alignment films 160, a sealant 130, and a plurality of spacers 140. The sealant 130 is used to support and adhere the LCD substrates 110 together. The LCD substrates 110 and the sealant 130 cooperatively form an accommodating space. The spacers 140 are located in the accommodating space, and liquid crystal molecules of the liquid crystal layer 150 are received in the accommodating space. The spacers 140 are also used to support the LCD substrates 110, so as to maintain a certain constant gap therebetween.

Figure 16:
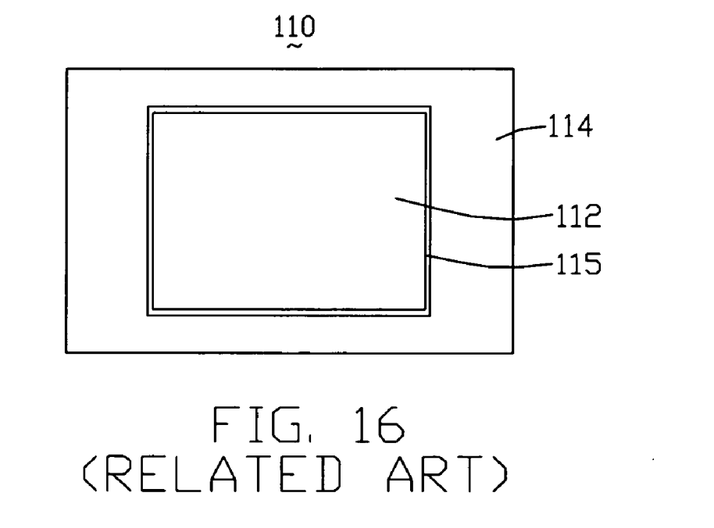
FIG. 16 is a top plan view of a bottom one the LCD substrates of FIG. 15.

Referring also to FIG. 16, one of the LCD substrates 110 of the LCD panel 100 is shown. The LCD substrate 110 defines a display region 112, a periphery region 114, and a sealant adhering region 115 between the display region 112 and the periphery region 114. The sealant adhering region 115 corresponds to the sealant 130. During the process of coating the alignment film 160 on the substrate 110, polyimide liquids (one of the materials of the alignment film 160) are only printed on the display region 112 and the periphery region 114. Thereby, the alignment film 160 is formed only on the display region 112 and the periphery region 114, without covering the sealant adhering region 115.

Figure 17:
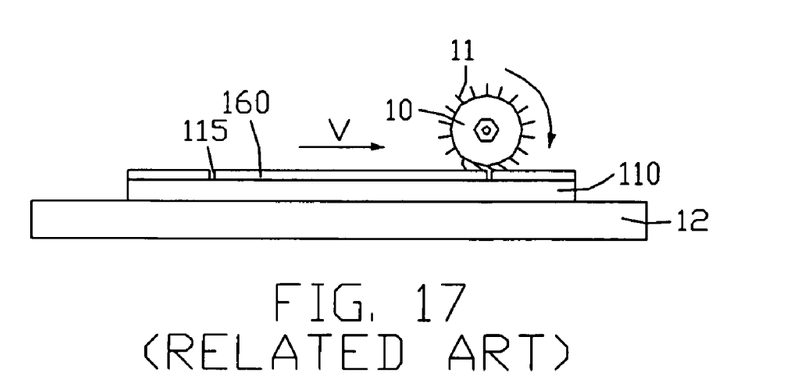
FIG. 17 is a side view showing a process of rubbing the alignment film of one of the LCD substrates of FIG. 15.

FIG. 17 is a schematic view illustrating a process of rubbing the alignment film 160 on one of the LCD substrates 110. The LCD substrate 110 is mounted on a workbench 12 of a rubbing device (not labeled). A rubbing cloth 11 is wrapped on a roller 10 of the rubbing device. The workbench 12 is moved horizontally toward the roller 10, and the roller 10 rotates in a predetermined direction to cause the rubbing cloth 11 to rotate correspondingly. Thus the rubbing cloth 11 directly contacts the alignment film 160 and steadily rubs the alignment film 160 from one side of the LCD substrate 110 to an opposite side of the LCD substrate 110.

After rubbing the alignment film 160, a great deal of loose particles of polyimide are liable to remain on the whole LCD substrate 110. The particles on the display region 112 and the periphery region 114 may be removed easily. However, the particles in the sealant adhering region 115 are difficult to remove, because the sealant adhering region 115 is lower than the display region 112 and the periphery region 114. If the particles in the sealant adhering region 115 are not removed, an area of contact between the sealant 130 and the substrate 110 is reduced. This means the bonding strength of the sealant 130 with the substrate 110 is correspondingly reduced.

What is needed, therefore, is an LCD substrate that can overcome the above-described deficiencies.

SUMMARY

In one aspect, a liquid crystal display substrate includes a display region, a periphery region around the display region, a sealant adhering region, and an alignment film formed on or over the display region and the periphery region. The sealant adhering region is between the display region and the periphery region. The alignment film at the periphery region includes a patterned area adjacent to the sealant adhering region. The patterned area has a groove structure.

In another aspect, a liquid crystal display substrate includes a display region, a periphery region around the display region, a sealant adhering region, and an alignment film formed on or over the display region and the periphery region. The sealant adhering region is between the display region and the periphery region. The alignment film at the periphery region includes a patterned area adjacent to the sealant adhering region. The patterned area is configured for receiving particles of the alignment film produced in a process of rubbing the alignment film.

Other aspects, novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
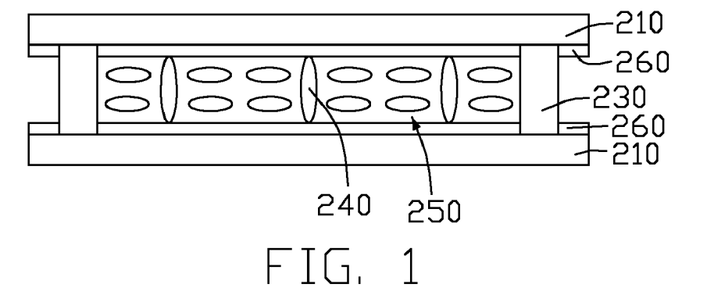
FIG. 1 is a side cross-sectional view of an LCD panel according to a first embodiment of the present invention, the LCD panel having two LCD substrates.

FIG. 1 is a side view of an LCD panel 200 according to a first embodiment of the present invention. The LCD panel 200 includes two LCD substrates 210, two alignment films 260 coated on inner surfaces of the LCD substrates 210 respectively, a liquid crystal layer 250 interposed between the alignment films 260, a sealant 230, and a plurality of spacers 240. The sealant 230 is used to support and adhere the LCD substrates 210 together. The LCD substrates 210 and the sealant 230 cooperatively form an accommodating space. The spacers 240 are located in the accommodating space, and liquid crystal molecules of the liquid crystal layer 250 are received in the accommodating space. The spacers 240 are also used to support the LCD substrates 210, so as to maintain a certain constant gap therebetween.

Figure 2:
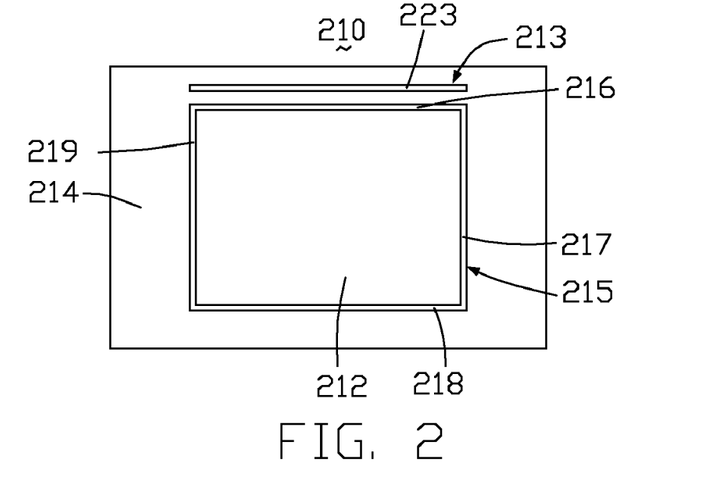
FIG. 2 is a top plan view of a bottom one the LCD substrates of FIG. 1.

Referring also to FIG. 2, a top plan view of a bottom one of the LCD substrates 210 is shown. The LCD substrate 210 defines a display region 212, a periphery region 214, and a sealant adhering region 215. The sealant adhering region 215 is in the shape of a rectangular frame, located between the display region 212 and the periphery region 214. The sealant adhering region 215 corresponds to the sealant 230. The alignment film 260 is coated on the display region 212 and the periphery region 214 without covering the sealant adhering region 215 and a patterned area 213. Thus, the sealant adhering region 215 is lower than the display region 212 and the periphery region 214. That is, the sealant adhering region 215 forms a groove structure. The alignment film 260 at the periphery region 214 includes the patterned area 213. The patterned area 213 has a groove structure 223. The patterned area 213 is elongate, and located between one long side of the sealant adhering region 215 and a corresponding long side edge of the LCD substrate 210.

The sealant adhering region 215 includes a first groove 216, a second groove 217, a third groove 218, and a fourth groove 219. The four grooves 216, 217, 218, and 219 are all strip-like and arranged end-to-end. The four grooves 216, 217, 218, and 219 have the same width. The four grooves 216, 217, 218, and 219 communicate with each other. The first groove 216 is parallel to the third groove 218, and vertical to the second groove 217. The second groove 217 is parallel to the fourth groove 219.

In the illustrated embodiment, the patterned area 213 is strip-like. The patterned area 213 is near and parallel to the first groove 216 of the sealant adhering region 215. A length of the patterned area 213 is equal to that of the first groove 216. A width of the patterned area 213 is equal to that of the first groove 216.

During a process of rubbing the alignment film 260 on the LCD substrate 210, the LCD substrate 210 is mounted on a workbench (not shown) of a rubbing device (not shown, but similar to FIG. 17). The rubbing device includes a rubbing cloth (not shown) wrapped on a roller (not shown). In an initial position of the LCD substrate 210, the side of the LCD substrate 210 having the patterned area 213 is nearest to the roller. The roller rotates in a predetermined direction and causes the rubbing cloth to rotate correspondingly. The workbench moves horizontally towards the roller, and the roller directly contacts the alignment film 260 and rubs the alignment film 260. The workbench continues to move horizontally, so that the alignment film 260 is steadily rubbed from one side of the LCD substrate 210 to an opposite side of the LCD substrate 210. A part of the periphery region 214 near the patterned area 213 is firstly rubbed. Thus, loose particles generated in the rubbing process are apt to firstly be retained on the periphery region 214 and the patterned area 213. The particles on the periphery region 214 may be removed easily, but the particles remaining in the patterned area 213 are difficult to remove because they are retained in the groove of the patterned area 213. Some, many, or even most of the particles generated during the rubbing process are retained in the patterned area 213. Therefore the amount of particles that become trapped in the sealant adhering region 215 is correspondingly reduced. If the particles in the sealant adhering region 215 are not removed, an area of contact between the sealant 230 and the substrate 210 is still relatively large and preserved compared to conventional art. If the particles in the sealant adhering region 215 are removed, the removal process may not be completely efficient. In such case, the reduced number of particles initially trapped in the sealant adhering region 215 is still advantageous. Either way, the relatively large area of contact between the sealant 230 and the substrate 210 means that the bonding strength between the sealant 230 and the substrate 210 is improved.

Figure 3:
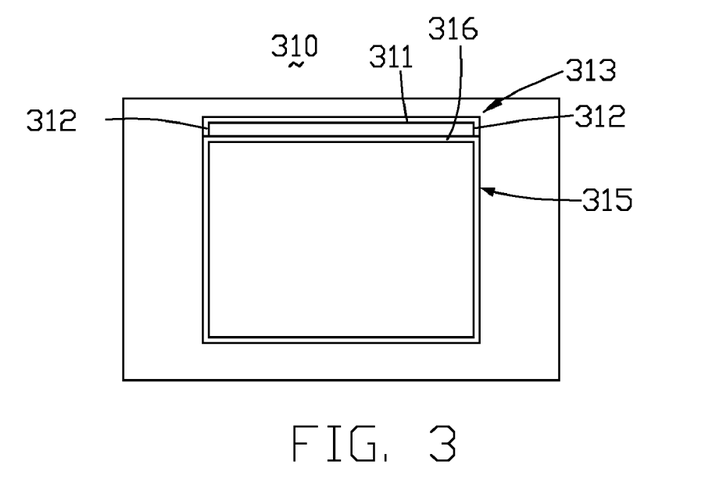
FIG. 3 is a top plan view of an LCD substrate according to a second embodiment of the present invention.

Referring to FIG. 3, an LCD substrate 310 according to a second embodiment of the present invention is shown. The LCD substrate 310 has a structure similar to that of the LCD substrate 210. However, a patterned area 313 is generally U-shaped, and includes a long groove 311 and two short grooves 312. The three grooves 311 and 312 are all strip-like. The two short grooves 312 are each vertical to the long groove 311. The long groove 311 is parallel to a first groove 316 of a sealant adhering region 315. A length of the long groove 311 is equal to that of the first groove 316. The two short grooves 312 are adjacent to two ends of the first groove 316, respectively. In the illustrated embodiment, the short grooves 312 are still separated from the first groove 316. In an alternative embodiment, the two short grooves 312 can communicate with the first groove 316, respectively.

Figure 4:
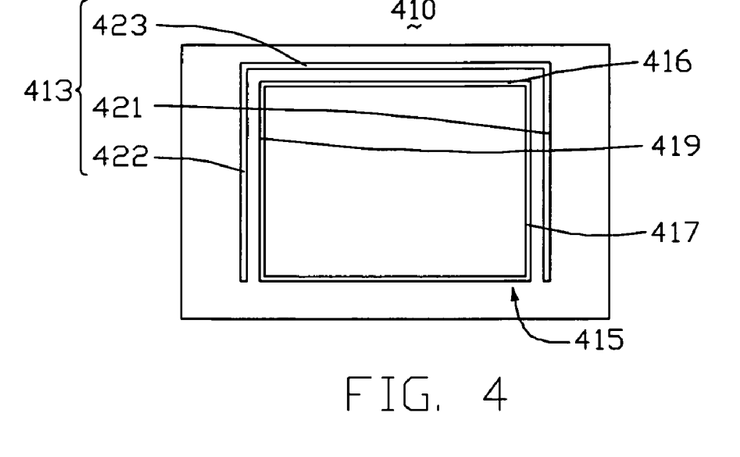
FIG. 4 is a top plan view of an LCD substrate according to a third embodiment of the present invention.

Referring to FIG. 4, an LCD substrate 410 according to a third embodiment of the present invention is shown. The LCD substrate 410 has a structure similar to that of the LCD substrate 210. However, a patterned area 413 is generally U-shaped, and includes a first side groove 421, a second side groove 422, and a connecting groove 423. The three grooves 421, 422, and 423 are all strip-like, and communicate with each other. The three grooves 421, 422, and 423 generally surround three sides of a sealant adhering region 415. The first side groove 421 is parallel to a second groove 417 of the sealant adhering region 415, and a length of the first side groove 421 is greater than that of the second groove 417. The second side groove 422 is parallel to a fourth groove 419 of the sealant adhering region 415, and a length of the second side groove 422 is greater than that of the fourth groove 419. The connecting groove 423 is parallel to a first groove 416 of the sealant adhering region 415, and a length of the connecting groove 423 is greater than that of the first groove 416.

Figure 5:
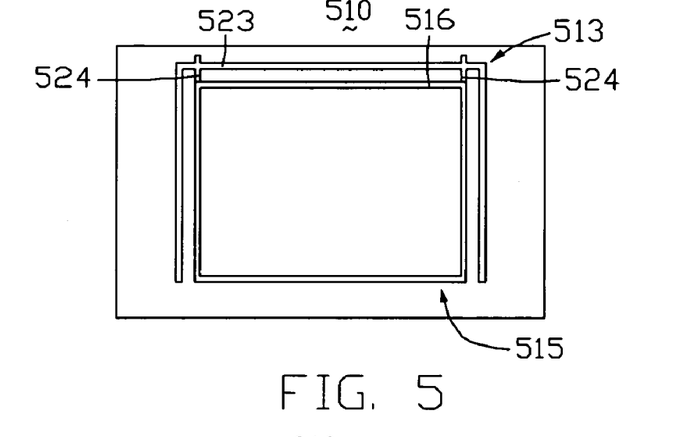
FIG. 5 is a top plan view of an LCD substrate according to a fourth embodiment of the present invention.

Referring to FIG. 5, an LCD substrate 510 according to a fourth embodiment of the present invention is shown. The LCD substrate 510 has a structure similar to that of the LCD substrate 410. However, a patterned area 513 further includes two short grooves 524. The two short grooves 524 vertically cross opposite ends of the connecting groove 523, respectively. That is, the two short grooves 524 communicate with the connecting groove 523, respectively. The two short grooves 524 are adjacent to two ends of a first groove 516 of a sealant adhering region 515, respectively. In the illustrated embodiment, the short grooves 522 are still separated from the first groove 516. In an alternative embodiment, the two short grooves 524 can communicate with the first groove 516, respectively.

Figure 6:
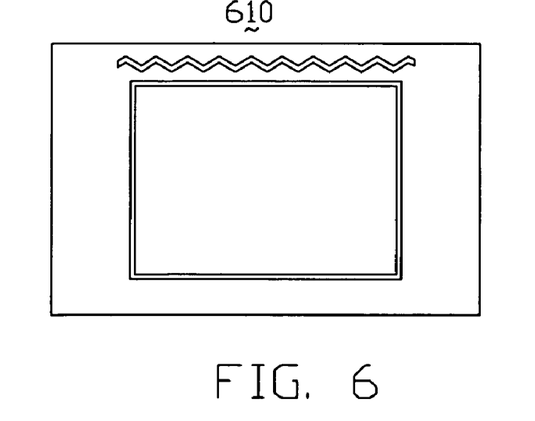
FIG. 6 is a top plan view of an LCD substrate according to a fifth embodiment of the present invention.
Figure 12:
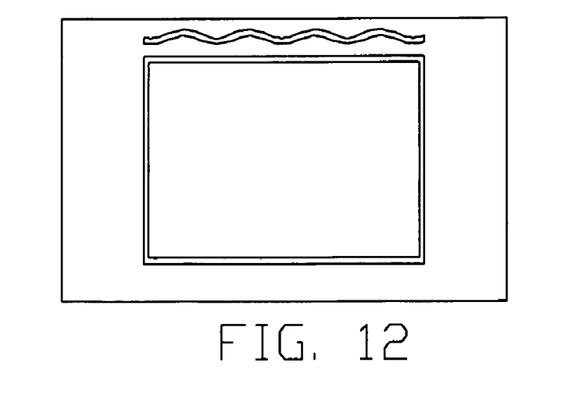
FIG. 12 is a top plan view of an LCD substrate according to an eleventh embodiment of the present invention.

Referring to FIG. 6, an LCD substrate 610 according to a fifth embodiment of the present invention is shown. The LCD substrate 610 has a structure similar to that of the LCD substrate 210. However, a patterned area (not labeled) is sawtooth shaped. The patterned area (not labeled) can instead be wavy, as shown in FIG. 12.

Figure 7:
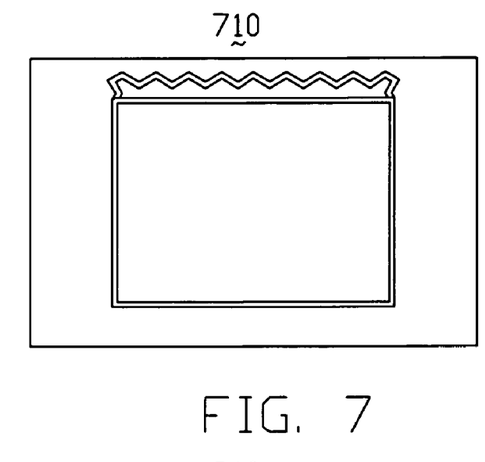
FIG. 7 is a top plan view of an LCD substrate according to a sixth embodiment of the present invention.
Figure 13:
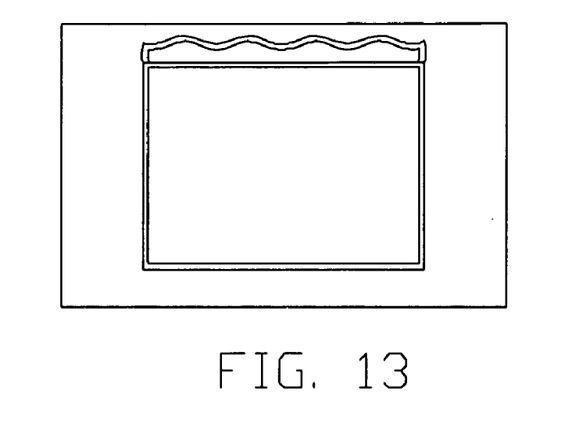
FIG. 13 is a top plan view of an LCD substrate according to a twelfth embodiment of the present invention.

Referring to FIG. 7, an LCD substrate 710 according to a sixth embodiment of the present invention is shown. The LCD substrate 710 has a structure similar to that of the LCD substrate 310. However, a long groove (not labeled) and two short grooves (not labeled) are all sawtooth shaped. The long groove (not labeled) and the two short grooves (not labeled) can instead all be wavy, as shown in FIG. 13.

Figure 8:
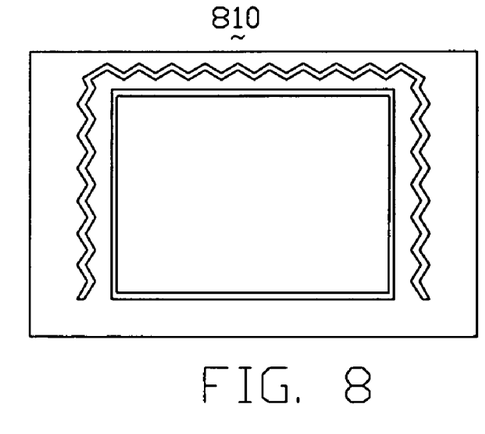
FIG. 8 is a top plan view of an LCD substrate according to a seventh embodiment of the present invention.

Referring to FIG. 8, an LCD substrate 810 according to a seventh embodiment of the present invention is shown. The LCD substrate 810 has a structure similar to that of the LCD substrate 410. However, a first side groove (not labeled), a second side groove (not labeled), and a connecting groove (not labeled) are all sawtooth shaped.

Figure 9:
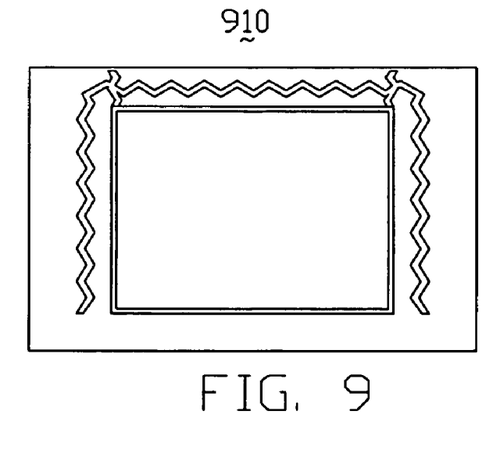
FIG. 9 is a top plan view of an LCD substrate according to an eighth embodiment of the present invention.
Figure 14:
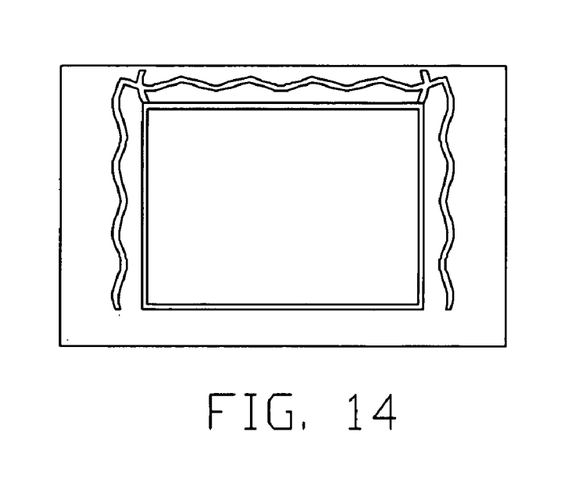
FIG. 14 is a top plan view of an LCD substrate according to a thirteenth embodiment of the present invention.

Referring to FIG. 9, an LCD substrate 910 according to an eighth embodiment of the present invention is shown. The LCD substrate 910 has a structure similar to that of the LCD substrate 510. However, a first side groove (not labeled), a second side groove (not labeled), a connecting groove (not labeled), and two short grooves (not labeled) are all sawtooth shaped. The first side groove (not labeled), the second side groove (not labeled), the connecting groove (not labeled), and the two short grooves (not labeled) can instead all be wavy, as shown in FIG. 14.

Figure 10:
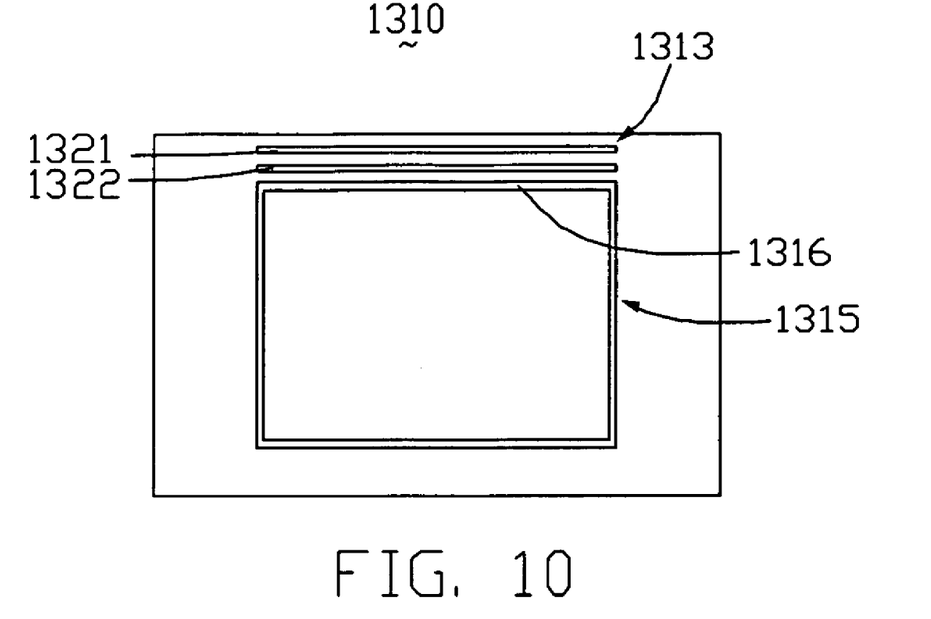
FIG. 10 is a top plan view of an LCD substrate according to a ninth embodiment of the present invention.

Referring to FIG. 10, an LCD substrate 1310 according to a ninth embodiment of the present invention is shown. The LCD substrate 1310 has a structure similar to the LCD substrate 210. However, a patterned area 1313 includes a first long groove 1321 and a second long groove 1322. The two grooves 1321 and 1322 are both strip-like, and have the same length. The first long groove 1321 and the second long groove 1322 are both near and parallel to a first groove 1316 of a sealant adhering region 1315. The length of the first long groove 1321 is equal to that of the first groove 1316.

Figure 11:
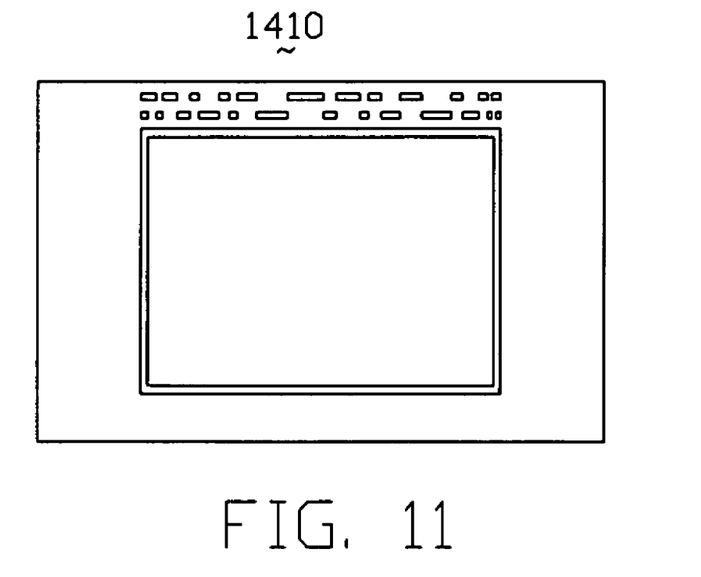
FIG. 11 is a top plan view of an LCD substrate according to a tenth embodiment of the present invention.

Referring to FIG. 11, an LCD substrate 1410 according to a tenth embodiment of the present invention is shown. The LCD substrate 1410 has a structure similar to that of the LCD substrate 1310. However, the LCD substrate 1410 includes a first line of grooves (not labeled) and a second line of grooves (not labeled). The grooves in each line of the grooves are separated from each other. The grooves in each line of the grooves have different random lengths.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A liquid crystal display substrate, comprising:
a display region;
a sealant adhering region substantially surrounding the display region;
a periphery region formed at a peripheral side of the sealant adhering region and separated from the display region by the sealant adhering region; and
an alignment film formed on or over the display region and the periphery region, the alignment film at the periphery region comprising a patterned area adjacent to the sealant adhering region, the patterned area having a groove structure.

2. The liquid crystal display substrate as claimed in claim 1, wherein the sealant adhering region forms a groove structure and comprises a first groove, a second groove, a third groove, and a fourth groove arranged end-to-end.

3. The liquid crystal display substrate as claimed in claim 2, wherein the patterned area is generally U-shaped and comprises a long groove and two short grooves, the long groove and two short grooves are all stripe-like, the two short grooves are vertical to the long groove respectively, the long groove is parallel to the first groove of the sealant adhering region, and the two short grooves contact the first groove of the sealant adhering region respectively.

4. The liquid crystal display substrate as claimed in claim 3, wherein the long groove and the two short grooves are all saw-toothed.

5. The liquid crystal display substrate as claimed in claim 3, wherein the long groove and the two short grooves are all wavy.

6. The liquid crystal display substrate as claimed in claim 2, wherein the patterned area is generally U-shaped and comprises a first side groove, a second side groove, and a connecting groove; the three grooves are all stripe-like, the three grooves generally half-encircle the sealant adhering region; the first side groove corresponds to the second groove of the sealant adhering region, the second side groove corresponds to the fourth groove of the sealant adhering region, and the connecting groove corresponds to the first groove of the sealant adhering region.

7. The liquid crystal display substrate as claimed in claim 6, wherein the first side groove, the second side groove, and the connecting groove are all saw-toothed.

8. The liquid crystal display substrate as claimed in claim 6, wherein the patterned area further comprises two short grooves, the two short grooves vertically cross the connecting groove and extend out from two opposite sides of the connecting groove respectively, the two short grooves communicate with the connecting groove respectively, and the two short grooves meet two ends of the first groove of the sealant adhering region respectively.

9. The liquid crystal display substrate as claimed in claim 8, wherein the first side groove, the second side groove, the connecting groove, and the two short grooves are all saw-toothed.

10. The liquid crystal display substrate as claimed in claim 8, wherein the first side groove, the second side groove, the connecting groove, and the two short grooves are all wavy.

11. The liquid crystal display substrate as claimed in claim 2, wherein the patterned area is generally U-shaped and comprises a long groove and two short grooves, the long groove and two short grooves are all stripe-like, the two short grooves are vertical to the long groove respectively, the long groove is parallel to the first groove of the sealant adhering region, and the two short grooves communicate with the first groove of the sealant adhering region respectively.

12. The liquid crystal display substrate as claimed in claim 1, wherein the groove structure of the patterned area is spaced from a corresponding portion of the sealant adhering region.

13. The liquid crystal display substrate as claimed in claim 12, wherein the groove structure of the patterned area is parallel to the corresponding portion of the sealant adhering region.

14. The liquid crystal display substrate as claimed in claim 13, wherein the patterned area further comprises at least one extending groove that includes one end extending to the sealant adhering region and another end extending to or crossing the groove structure of the patterned area.

15. A liquid crystal display substrate, comprising:
a display region; and
a sealant adhering region substantially surrounding the display region;
a periphery region surrounding the sealant adhering region and being separated from the display region by the sealant adhering region; and
an alignment film formed on or over the display region and the periphery region, the alignment film at the periphery region comprising a patterned area adjacent to the sealant adhering region;
wherein the patterned area comprises a groove structure for receiving particles of the alignment film produced in a process of rubbing the alignment film.

16. A liquid crystal display (LCD) substrate, comprising:
two LCD substrates;
a sealant adhering the two LCD substrates together; and
an alignment film formed on at least one of the two substrates;
wherein at least one of the two LCD substrates defines a sealant adhering region where the sealant is located, the alignment film covers an inner surface of the at least one of the two LCD substrates while exposing the sealant adhering region, and the alignment film forms a groove structure at a peripheral side of the sealant.

17. The liquid crystal display substrate as claimed in claim 16, wherein the groove structure of the patterned area is spaced from a corresponding portion of the sealant adhering region.

18. The liquid crystal display substrate as claimed in claim 17, wherein the groove structure of the patterned area is parallel to the corresponding portion of the sealant adhering region.

19. The liquid crystal display substrate as claimed in claim 18, wherein the patterned area further comprises at least one extending groove including one end extending to the sealant adhering region and the other end extending to or crossing the groove structure of the patterned area.

20. The liquid crystal display substrate as claimed in claim 16, wherein the groove structure is generally U-shaped.

* * * * *